United States Patent Office 3,394,991
Patented July 30, 1968

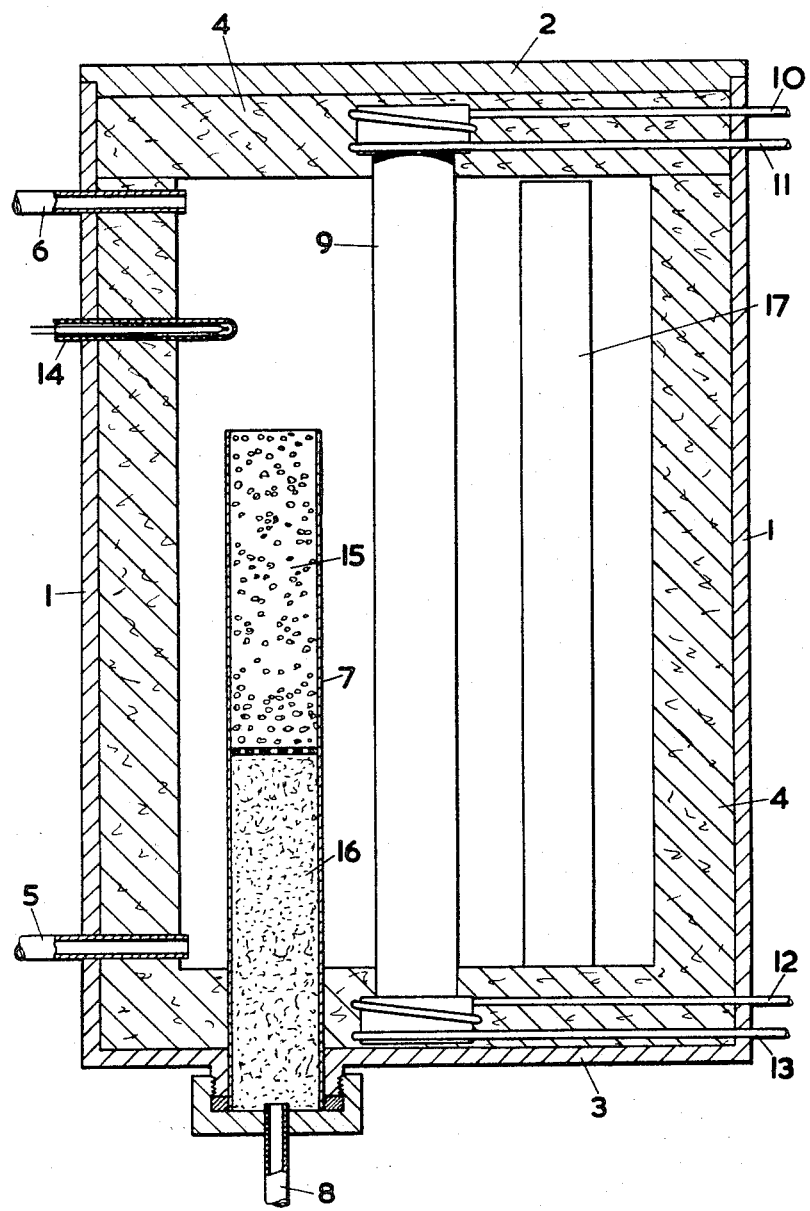

3,394,991
MANUFACTURE OF SILICON NITRIDE
Christopher Charles Evans, Saffron Walden, England, assignor to the Minister of Technology in the Government of the United Kingdom
Filed Oct. 23, 1964, Ser. No. 406,127
Claims priority, application Great Britain, Oct. 28, 1963, 42,439/63
16 Claims. (Cl. 23—191)

ABSTRACT OF THE DISCLOSURE

High yields of silicon nitride whiskers, having high tensile strength and substantially uncontaminated by other crystalline phases, are produced by heating silicon/silica mixture to form a silicon-containing vapour, reacting this vapour with nitrogen at about 1400° C. in the presence of carbon and hydrogen, whereby silicon nitride whiskers are deposited on substrates adjacent the gaseous reaction zone.

---

The present invention relates to the manufacture of silicon nitride in the form of elongated single-crystal fibres known as whiskers. The term whisker is generally applied to any single-crystal fibre having a thickness less than about 0.1 millimetre and a length to thickness ratio of at least 100.

Whiskers are potentially of great importance in the reinforcement of metals and other materials as a result both of their shape and their high tensile strength. The elongated shape of whiskers should render them difficult particles to displace to the grain boundaries of metals in which they are dispersed, thus significantly increasing the creep resistance of the metals; and the high tensile strength of many whiskers makes it possible for them to act as reinforcing fibres in metals in the same way that fibres such as glass fibres act in reinforced plastics.

Whiskers of great interest are those made from very stiff and light covalent compounds, as these compounds have elastic moduli higher than most metals and are often many times stronger than steel, especially in proportion to their weight. Of particular interest as reinforcing whiskers are refractory compounds such as carbides, nitrides and oxides. Many two-element compounds have been produced in whisker form, particularly alumina (aluminium oxide or sapphire), but in general the preparation is difficult, the preparative processes being critically affected by slight variations in process conditions and extreme difficulty being experienced in attempting to scale-up any successful small-scale preparations. Furthermore, the yields and efficiencies of the preparative processes are low and whiskers are often produced in a variety of polymorphic forms from which any polymorph having desirable properties such as thermal stability is difficult to isolate.

Silcon nitride occurs in only two polymorphic whisker forms, α- and β-Si₃N₄, but the β-Si₃N₄ is a high temperature form which normally occurs above 1600° C. The present invention is concerned with the production of whiskers of α-Si₃N₄. The useful mechanical and refractory properties of silicon nitride whiskers (normally a mixture of α- and β-phases) have stimulated research for processes of making silicon-nitride whiskers and it has been found that whiskers of silicon nitride can be prepared in small quantities by passing nitrogen over powdered silicon heated to about 1400° C. However, the yield of whiskers obtained in this way is poor, rarely approaching more than about 1% based on starting material, and the efficiency of the process is very low, a high proportion of the silicon starting material being converted to silicon nitride granules in situ.

It is an object of the present invention to provide a process in which silicon nitride whiskers are produced in high yield and in which the hereinbefore described defects of the prior art are overcome.

It is a further object of the invention to provide a process in which silicon nitride whiskers are produced by an efficient reaction in which a conversion of up to sixty percent of the silicon-containing starting material to silicon nitride whisker product may be achieved.

It is another object of the invention to provide a process for the production of silicon nitride whiskers which is not critically affected by minor variations in the process conditions.

It is a further object of the invention to provide a process for the production of silicon nitride whiskers in large quantities on a scale which is in general solely limited by the capacity of the apparatus in which the process is carried out.

It is another important object of the present invention to provide apparatus in which the process for the manufacture of silicon nitride whiskers may be effectively carried out.

In accordance with the invention, a process for the manufacture of silicon nitride whiskers comprises heating a mixture of silicon and silica at a temperature above 1200° C. to form a silicon-containing vapour, mixing the silicon-containing vapour with nitrogen in the presence of carbon and a small proportion of hydrogen, and contacting the resulting mixture with a substrate heated to a temperature of at least 1200° C., whereby silicon nitride is formed as whiskers upon the substrate.

Analysis indicates that the silicon-containing vapour consists predominantly of silicon monoxide together with a small quantity of elemental silicon vapour, but throughout this specification and claims silicon-containing vapour should be taken to mean a vapour containing silicon whether in elemental or combined form.

Silicon nitride whiskers are preferably prepared by a continuous process in which the whiskers are continuously formed upon the substrate. Such a continuous process is normally terminated only when the apparatus in which the reaction takes place is filled with whiskers. A continuous process in accordance with the invention may be achieved by providing a reaction zone into which silicon-containing vapour and nitrogen are continuously supplied and intermixed in the presence of carbon and hydrogen, so that silicon nitride whiskers are formed continuously upon the surface of a substrate adjacent the reaction zone. Silicon-containing vapour may be carried to the reaction zone by a stream of an inert gas which is passed through the heated mixture of silicon and silica and which evaporates the silicon-containing vapour from the heated mixture. Nitrogen may be introduced directly into the reaction zone in any convenient manner, but to avoid premature and undesirable reactions nitrogen should not be passed to the reaction zone through the heated mixture of silicon and silica.

The temperature at which the mixture is heated should normally be within the broad range of about 1200°–1600° C. The rate at which silicon-containing vapour is formed increases with temperature and satisfactory operational temperatures are between 1350°–1500° C. High yields of silicon nitride whiskers are obtained when the substrate upon which the whiskers are formed is maintained between about 1375°–1500° C. and preferably between 1425°–1450° C. As the temperature of the substrate is increased above 1500° C. a polymorphic form of silicon nitride is formed in increasing proportions which form does not possess the desirable properties of the lower temperature form. High temperatures also increase the rate of attack by silicon-containing vapour upon the carbon present and particularly upon the carbon electrode normally used as a heating element. This results in the undesirable formation of silicon carbide and decreases the efficiency of the whisker forming reaction. It is found that whiskers are formed particularly well when the substrate is maintained at a temperature a little below the temperature of the mixture of silicon and silica. A difference of about 35° C. is generally satisfactory.

The mixture of silicon and silica preferably consists of an intimate blend of finely divided silicon and finely divided silica and contains about equimolar proportions of silicon and silica. Although the proportions of silicon and silica may be varied greatly whilst still yielding some suitable silicon-containing vapour, we have found that the highest yield of silicon nitride whiskers is obtained by using equimolar proportions.

The mixture is conveniently pressed into pellets and this is aided by incorporating a small proportion of binder, for example 5% of moist sugar, in the mixture, moulding pellets from the mixture and baking the pellets to 300° C.

I have discovered that the presence of hydrogen and carbon at the gaseous mixing stage is essential in order to produce good yields of silicon nitride whiskers. However, I have found that it is often unnecessary to specifically introduce hydrogen at this gaseous mixing stage when carrying out a process in accordance with the invention in the presence of fresh carbon which has not previously been employed in such a process. I believe this to be due to the fresh carbon containing sorbed hydrogen which is released from the fresh carbon on heating to take part in the reaction. It will be appreciated that the silicon nitride whisker forming process could be carried out in the presence of fresh carbon without the importance of hydrogen being apparent. Supporting evidence for the necessity of hydrogen being present is that if the carbon is re-used in a subsequent process in accordance with the invention, the yield of whiskers is drastically reduced and sometimes virtually no whiskers may be formed at all; whereas if gaseous hydrogen is deliberately introduced, even in small quantity, into the gaseous mixing stage of the process employing the previously-used carbon, then the yield will be restored to a value of the same order as when fresh carbon was used.

The proportion of hydrogen necessary to produce good yields of silicon nitride whiskers may be as little as 0.1% by volume of the nitrogen present and a proportion of 1% may generally be used. However, up to 10% hydrogen may be used advantageously. Higher proportions tend to cause rapid and undesirable erosion of the carbon present, which is especially serious if electrically-heated carbon elements are used to achieve the temperatures required to carry out the process.

Hydrogen may be introduced conveniently into the reaction zone by adding an appropriate proportion to the inert gas before this is passed through the heated mixture of silicon and silica.

The carbon required to be present at the gaseous mixing stage may be provided in any convenient form, but carbon cloth, made from woven carbon fibres, is particularly suitable as the cloth also forms a substrate upon which silicon nitride whiskers may form.

An alternative means of ensuring that the required quantities of carbon and hydrogen are present at the gaseous mixing stage of the silicon nitride whisker process is to pass a volatile hydrogen and carbon-containing compound, such as a hydrocarbon, into the gaseous mixture of silicon-containing vapour and nitrogen. The compound may be introduced in any practicable manner and may, for example, be conveniently introduced with the stream of nitrogen when the nitrogen is being passed into the reaction zone.

The process by which silicon nitride whiskers are produced in accordance with the invention is an extremely complex process which probably involves many stages. As described herein, I have found that the presence of carbon, hydrogen, nitrogen and a silicon-containing vapour consisting predominantly of silicon monoxide are essential to the efficient production of silicon nitride whiskers. From preliminary studies it appears that during the whisker forming process hydrogen combines with some of the carbon present to form a species which may react with the silicon monoxide vapour. A reaction then takes place from which silicon nitride is formed as whiskers and in which the oxygen from the silicon monoxide apparently combines with the carbon present to form carbon monoxide. The carbon monoxide produced is found to be in direct stoichiometric proportion to the reacted silicon monoxide and the minimum quantity of carbon which should be present in the whisker-forming process is therefore a proportion equivalent to the amount of silicon introduced.

Silicon nitride whiskers may conveniently be prepared, in accordance with the invention, in the following general manner.

A bed of silicon/silica pellets is placed within a high temperature furnace and an inert gas is passed through the bed so that silicon-containing vapours formed by the mixture pass into the interior of the furnace. Nitrogen is passed directly into the interior of the furnace and mixes with the silicon-containing vapour in the presence of carbon and hydrogen which are provided within the furnace. Whiskers of silicon nitride are formed upon suitable substrates inside the furnace.

A furnace and its use for the production of silicon nitride whiskers in accordance with the invention will now be described with reference to the accompanying drawing which shows a vertical cross-sectional view through the furnace. The furnace described provides a large hot zone in which silicon nitride whiskers may be formed and the furnace can be scaled up to any desired size. The hot zone illustrated in the accompanying drawing is cylindrical and has a volume of about 2.5 cu. ft.

The furnace comprises an outer casing consisting of cylinder 1 having end faces 2 and 3 and the inner sides of the casing are covered with thermal insulating material 4. Inlet pipe 5 and outlet pipe 6 pass through the wall of the outer casing and allow gases to be passed into, and removed from, the interior of the furnace.

Disposed within the outer casing is a container consisting of a hollow tube 7 having an inlet pipe 8 leading to it from a point outside the outer casing. A number of containers having this construction may be provided, thus increasing the capacity of the apparatus.

A carbon heating electrode 9 is fitted within the casing and copper pipes 10, 11, 12 and 13 are provided to pass electric current through the carbon electrode and at the same time to allow cooling water to be circulated around each end of the electrode. In addition to the carbon electrode, auxiliary heating means may be fitted to the containers disposed within the outer casing to allow for regulation of the temperature at which the containers are heated.

Temperatures within the outer casing may be continuously monitored by a thermocouple 14 and the whisker product may be removed from the apparatus by removing the end face 2 which is constructed in the form of a lid.

A typical example of a process for the manufacture of silicon nitride whiskers will now be given.

120 g. of an equimolar silicon/silica mixture are introduced into the container 7 to form a bed 15, and a heavy electric current is passed through the electrode 9 to heat it to about 1550° C. The space within the outer casing and the bed 15 are thus heated to about 1440° C. and argon gas then is passed into the inlet tube 8 at a rate of about one litre/minute and through the bed 15 which is heated to about 1475° C. The argon is pre-heated before it reaches the bed 15 by interposing carbon granules 16 between the inlet tube 8 and the bed. As described hereinbefore, hydrogen or a hydrocarbon may be introduced with the stream of nitrogen before the gases pass through the bed. Where 1% of hydrogen is introduced this should be at a flow rate of about 30 mls./minute.

Silicon-containing vapours formed in the heated bed 15 are carried by the argon gas into the reaction space enclosed by the outer casing where they mix, in the presence of carbon and a small amount of hydrogen, with nitrogen introduced directly into the reaction space at a rate of about three litres/minute through the inlet tube 5, and form silicon nitride whiskers. The silicon nitride whiskers may grow upon the surface of the lagging if the lagging is composed of a suitable substrate material such as carbon particularly in the form of carbon cloth, but the silicon nitride whiskers are preferably grown upon one or more mullite surfaces 17 which are provided within the reaction space. The used gases pass out through the outlet pipe 6.

About 70 g. of silicon nitride whisker product are obtained after a reaction time of 60 hours. The product has the appearance of a white, fibrous mass and is found to consist mainly of silicon nitride whiskers having a thickness of between about 1 to 2 microns and a length of up to about 7 cm. The whisker product has a very low density, 1 cubic centimeter of whiskers weighing about one five-hundredth of a gramme. It will be appreciated that 70 grammes of whiskers represent a considerable yield, especially in relation to the prior art in which a yield of one-tenth of a gramme has been considered very satisfactory.

We claim:

1. A process for the manufacture of silicon nitride whiskers which comprises heating a mixture of silicon and silica at a temperature above 1200° C. to form a silicon-containing vapour, mixing the silicon-containing vapour with nitrogen in the presence of carbon and from between about 0.1 and 10% by volume of hydrogen based on the volume of nitrogen present, and contacting the resulting mixture with a substrate heated to a temperature of at least 1200° C., whereby a vapour phase reaction produces silicon nitride formed as whiskers upon the surface of the substrate.

2. A process according to claim 1 in which the silicon-containing vapour and the nitrogen are continuously supplied to a reaction zone and continuously intermixed in the said reaction zone in the presence of carbon and from between about 0.1 to 10% by volume of hydrogen based on the volume of nitrogen present, and in which a vapour phase reaction produces silicon nitride continuously formed as whiskers upon the surface of the substrate.

3. A process according to claim 1 wherein the mixture of silicon and silica is heated at a temperature between about 1350° C. and 1500° C.

4. A process according to claim 1 wherein the substrate is heated at a temperature between about 1375° C. and 1500° C.

5. A process according to claim 1 and in which the mixture of silicon and silica contains equimolar proportions of silicon and silica.

6. A process according to claim 1 and in which the mixture of silicon and silica comprises an intimate blend of finely-divided silicon and silica.

7. A process according to claim 1 and in which the mixture of silicon and silica is provided in pellet form.

8. A process according to claim 7 and in which the mixture of silicon and silica contains about 5% of binder.

9. A process according to claim 8 and in which the binder is sugar.

10. A process according to claim 2 and in which the silicon-containing vapour is carried to the reaction zone by a stream of an inert gas which is passed through the heated mixture of silicon and silica.

11. A process according to claim 10 wherein the inert gas is argon.

12. A process according to claim 10 and in which hydrogen is supplied to the reaction zone in the stream of inert gas.

13. A process according to claim 1 in which carbon is present in the form of carbon cloth.

14. A process according to claim 2 and in which carbon and hydrogen are supplied to the reaction zone in the form of a volatile hydrocarbon.

15. A process according to claim 14 and in which the carbon and hydrogen are supplied to the reaction zone by introducing a volatile hydrocarbon into the supply of nitrogen.

16. A process according to claim 1 in which the substrate is a member of the group consisting of carbon, silicon carbide, aluminium oxide and mullite.

References Cited

UNITED STATES PATENTS

| | | | |
|---|---|---|---|
| 2,636,828 | 4/1953 | Nicholson | 106—55 |
| 3,089,788 | 5/1963 | Marinace | 148—1.6 |
| 3,199,954 | 8/1965 | Pultz | 106—55 |

OTHER REFERENCES

Parr et al.: "Structural Aspects of Silicon Nitride," Powder Metallurgy, No. 7–10, p. 156 (1961).

Glenny et al.: "Mechanical Strength and Thermalfatigue Characteristics of Silicon Nitride," Powder Metallurgy, No. 7–10, p. 194 (1961).

OSCAR R. VERTIZ, *Primary Examiner.*

H. S. MILLER, *Assistant Examiner.*